United States Patent [19]

Baseghi et al.

[11] Patent Number: 4,891,778
[45] Date of Patent: Jan. 2, 1990

[54] DISCRETE COHERENT CHIRP GENERATOR

[75] Inventors: Behshad Baseghi; Oscar Lowenschuss, both of Santa Barbara, Calif.

[73] Assignee: Raytheon Company, Lexington, Mass.

[21] Appl. No.: 289,130

[22] Filed: Dec. 23, 1988

[51] Int. Cl.$^4$ .............................................. G06F 1/02
[52] U.S. Cl. ................................................... 364/721
[58] Field of Search ................... 364/718, 721; 84/1.01

[56] References Cited

U.S. PATENT DOCUMENTS 4,225,936  9/1980  Leshe .................................... 364/718
4,375,777  3/1983  Nishimoto ........................... 364/721
4,692,886  9/1987  Miki et al. ............................ 364/718

Primary Examiner—Gary V. Harkcom
Assistant Examiner—Long T. Nguyen
Attorney, Agent, or Firm—Edmund J. Walsh; Richard M. Sharkansky

[57] ABSTRACT

A discrete coherent chirp generator capable of generating a plurality of coherent sinusoidal signals. The chirp generator comprises a programmable read only memory containing samples of one period of a sine wave. Additional circuitry generates addresses to the programmable read only memory at periodic intervals to cause samples of a sine wave of the desired frequency to be read out of the programmable read only memory. As a particular application, a plurality of frequency modulated signals can also be generated.

8 Claims, 3 Drawing Sheets

DISCRETE COHERENT CHIRP GENERATOR

BACKGROUND OF THE INVENTION

This invention relates generally to electronic warfare counter measures and more particularly to the generation of numerous coherent sinusoidal signals.

Electronic signals play an important role in modern combat situations. For example, radar is used for surveillance, targeting and guidance. Consequently, circumventing an adversary's radar is also important. One prevalent technique for circumventing radar is to build a decoy which generates signals to "fool" the radar.

One simple technique for fooling radar is to receive the signal transmitted by the radar and then retransmit the signal back at the radar. The radar might be fooled into thinking the retransmitted signal is actually a radar reflection from an airplane or a tank or some other important piece of military hardware (hereinafter referred to generically as a "target"). The drawback of this technique, however, is that sophisticated radars can distinguish between signals retransmitted by decoys and radar reflections from targets.

Radar reflections from a target are actually a superposition of reflections from various points on the targets. The points will be at different ranges from the radar such that the radar reflection is actually a superposition of reflections delayed in time relative to each other. Moreover, the reflection from each point will undergo a Doppler phase shift and each point could have a different Doppler shift. For example, the radar reflections from the exhaust plume of an airplane will have a different Doppler shift than the reflections from the body of the airplane.

In short, to fool a more sophisticated radar, a decoy must retransmit a superposition of signals, each one delayed and modulated with different frequencies. A drawback of such an approach is the number of oscillators needed to generate the retransmitted signal. A separate oscillator could be required to modulate each signal in the superposition. Constructing a decoy using that many oscillators is costly, technically complicated, and otherwise undesirable.

An alternative approach to using numerous analog oscillators is to store digitized samples of signals of the desired frequencies in memories. The samples are read out of each memory sequentially at constant time intervals and used in place of oscillator outputs. Such an approach, however, is still relatively complicated because of the need for memory for each frequency to be generated.

SUMMARY OF THE INVENTION

With the foregoing background of the invention in mind, it is therefore an object of this invention to provide a simple means for producing a plurality of signals at different frequencies.

It is a further object of this invention to provide a simple means for modulating a plurality of signals at different frequencies.

The foregoing and other objects are accomplished by a first memory which stores sequential samples of a sine wave and means for generating addresses for the first memory to cause the values at the output of the memory to represent digitized samples of a sine wave at any frequency. The means for generating addresses in turn comprises: (a) a second memory having one storage location for each frequency to be generated, each such location containing a digital word indicating the number of clock pulses in one period of a sine wave of the corresponding frequency; (b) a third memory having one storage location for each frequency to be generated, each such location containing a digital word indicating the number of periods of a sine wave that have been generated for the corresponding frequency; (c) a fourth memory having one storage location for each frequency to be generated, each such location containing a digital word indicating the frequency to be generated; (d) a fifth memory having one storage location for each frequency to be generated, each such location containing a digital word indicating the phase correction needed for each period of the corresponding frequency; and (e) arithmetic means for combining words in each memory to produce an address to the first memory.

BRIEF DESCRIPTION OF THE DRAWINGS

The invention will be further understood by reference to the following more detailed description and the accompanying drawings in which.

DESCRIPTION OF THE PREFERRED EMBODIMENT

Figure 1:
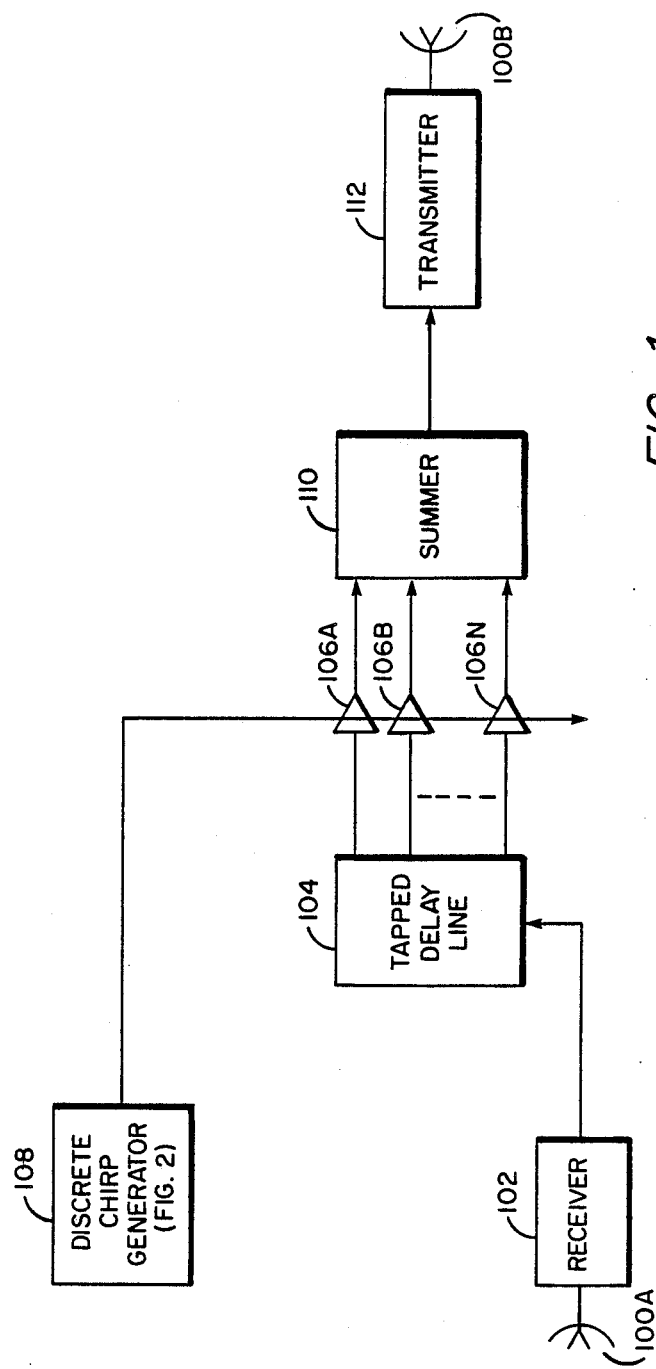
FIG. 1 is a block diagram, greatly simplified, of a system in which the system might be used.

FIG. 1 shows a system in which the present invention might be employed. Radar signals incident on antenna 100A are processed in a known manner by receiver 102. The received signal is fed to tapped delay line 104. The signals at each tap are amplified a predetermined amount (i.e. "weighted") by amplifiers 106A...106N. The weighted signals are combined by summer 110 and retransmitted by transmitter 112 via antenna 100B. Antennas 100A, 100B, tapped delay line 104, amplifiers 106A...106N, summer 110 and transmitter 112 are all well known components.

The weights for the amplifiers 106A...106N are developed by discrete chirp generator 108, which is explained in greater detail below. Suffice it to say here, that discrete chirp generator 108 produces signals for amplifiers 106A...106N in sequence which dictate the weight of the amplifiers. Control logic (not shown) ensures the appropriate weights are provided to the appropriate one of the amplifiers 106A...106N.

In operation, the system of FIG. 1 generates a plurality of signals delayed with respect to each other and modulated with different frequencies. Tapped delay line 104 converts the received radar signal into a plurality of signals, each delayed relative to the others. Discrete chirp generator 108 generates weights for amplifiers 106A...106N which effectively modulate the signals out of tapped delay line 104 with a specific frequency.

A little thought will reveal that the required modulation can be obtained by varying the weights on each of the amplifiers 106A...106N sinusoidally at the modulation frequency. Moreover, the weights can be changed in discrete steps provided the change is made at a rate well above the Nyquist frequency for the modulation frequency.

Figure 2:
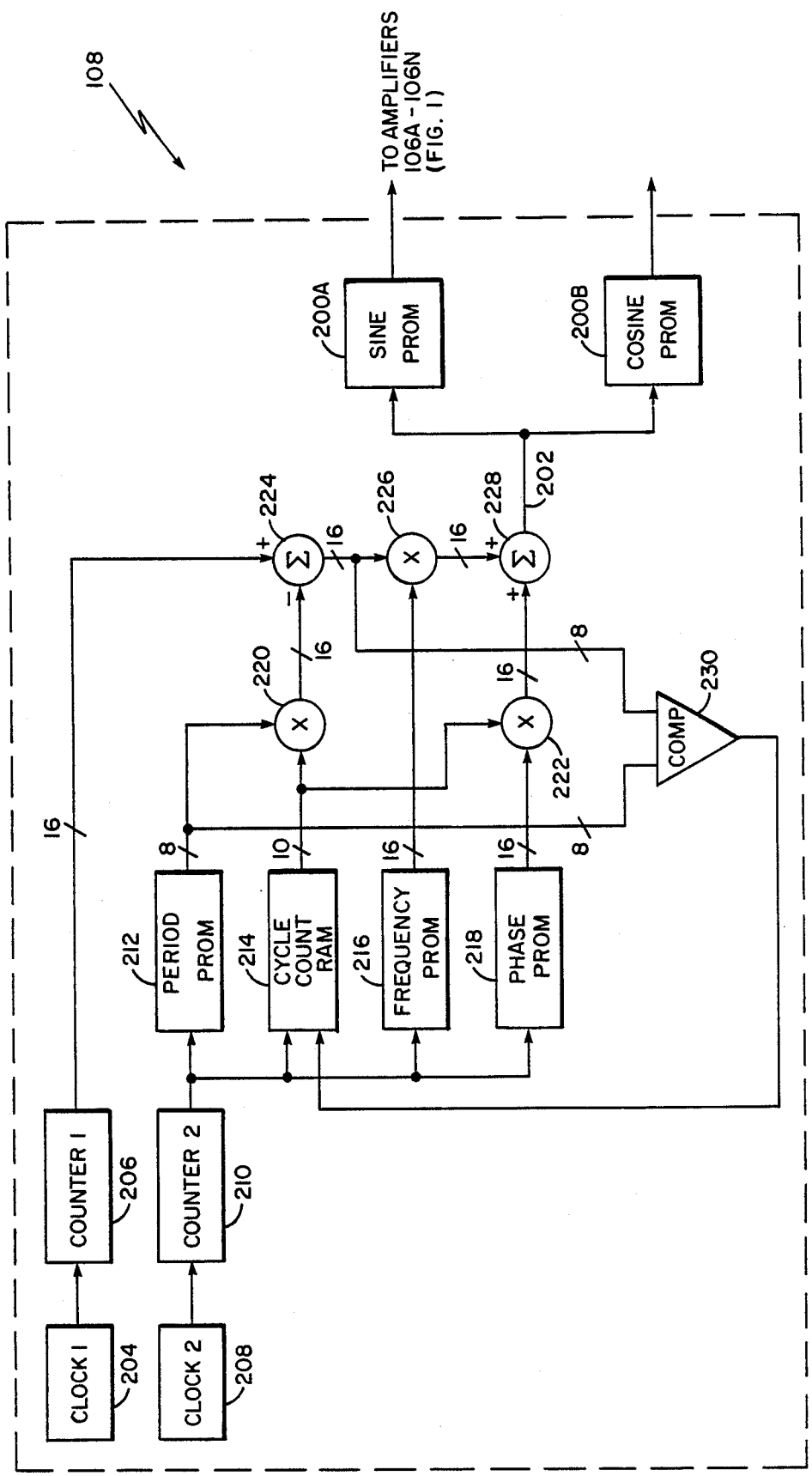
FIG. 2 is a block diagram of an apparatus constructed according to the present invention.

Turning now to FIG. 2, additional details of discrete chirp generator 108 may be seen. Sine PROM 200A is a programmable read only memory (PROM) of known construction and contains a plurality of storage locations (or words), here 8k locations each having eight bits. Sine PROM 200A stores in its sequential locations digitized samples of one period of a sine wave. As will be described in greater detail below, addresses to sine PROM 200A are developed on line 202 to cause the values read out of sine PROM 200A to describe a sine wave of a desired frequency.

For example, suppose the desired frequency is 1Hz and a sample is to be read out of sine PROM 200A every 1 ms. Each millisecond, the address on line 202 would have to increase in steps of 8. With addresses generated in that fashion, the 8k samples in sine PROM 200A representing one period of a sine wave would be read out in one second. To generate samples representing a 10 Hz sine wave, the addresses on line 202 would have to increase in steps of 80 each millisecond.

Cosine PROM 200B is similar to sine PROM 200A. However, the values stored in cosine PROM 200B describe a cosine wave rather than a sine wave.

Turning now to the remaining elements in FIG. 2, the manner in which addresses for sine PROM 200A and cosine PROM 200B can be understood. It will be apparent to one of skill in the art that the components of FIG. 2 are well known components in digital systems. It will also be apparent that standard elements of digital circuits, such as control wires and power connections, are not explicitly shown. Clocks 204 and 208 produce pulses at periodic intervals. Here, clock 204 Counters 206 and 210 have as outputs digital words which increase in value by one bit for each pulse from clock 204 and clock 208, respectfully. Here, counter 206 has an output digital word with 16 bits and counter 210 has an output digital word with 10 bits.

Period PROM 212, frequency PROM 216, and phase PROM 218 are programmable read only memory devices of known construction. Here, each of the PROMs 212, 216 and 218 contains 1k words. Here, the words in period PROM 212 have eight bits, the words in frequency PROM 216 have sixteen bits, and the words in phase PROM have sixteen bits.

Cycle count RAM 214 is a random access memory of known construction. Here, cycle count RAM 214 has 1k words each with ten bits. The contents of each word of cycle count RAM 214 can be modified in response to the output of comparator 230. Such modification is described below.

In operation, counter 210 provides addresses to PROMs 212, 216 and 218, and cycle count RAM 214. The words read out of PROMs 212, 216 and 218 and RAM 214 are applied to multipliers 220, 222 and 226 and adders 224 and 228. The multipliers 220, 222 and 226 and adders 224 and 228 compute, in a way to be described in greater detail below, the desired address for sine PROM 200A and cosine PROM 200B.

Figure 3:
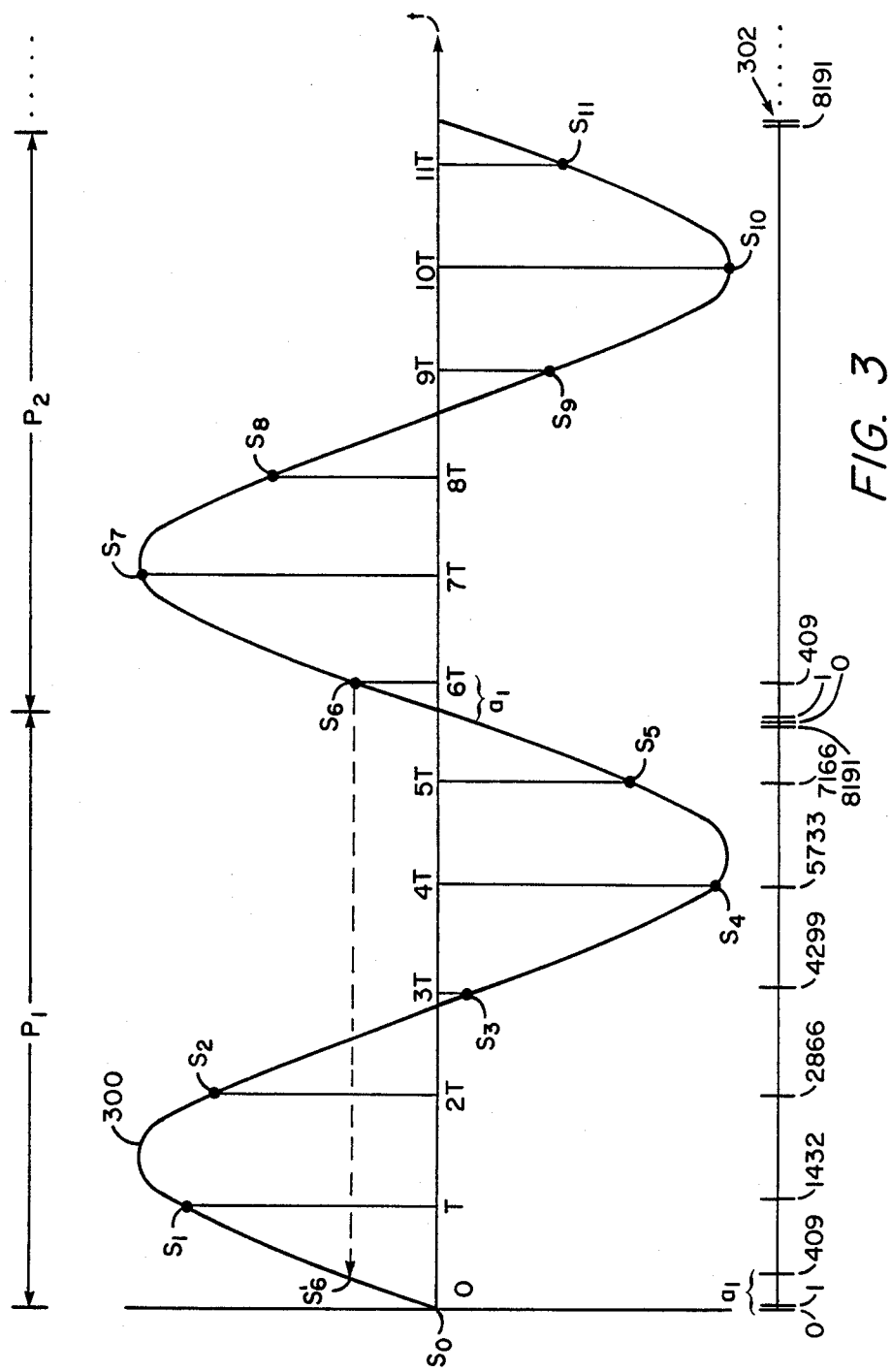
FIG. 3 is a sketch useful in understanding the operation of the apparatus in FIG. 2.

Turning now to FIG. 3, the manner in which addresses on line 202 are computed can be better understood. Generated sine wave 300 is the outline of a sinusoidal waveform at a desired frequency. Samples $S_0$, $S_1$... represent samples of generated sine wave 300 which are read out of sine PROM 200A at equidistant intervals along the time axis t.

The location at which the required value is stored in sine PROM 200A is indicated on address axis 302. For example, sample $S_0$ is aligned with value 0 on the address axis 302. Thus, to generate the appropriate value for sample $S_0$, the address 0 should be applied on address line 202. Likewise, sample $S_1$ is aligned with 1,432 and that address must be applied on address line 202 when sample $S_1$ is to be generated.

It should be noted that FIG. 3 shows two periods, $P_1$ and $P_2$ of generated sine wave 300. However, it will be understood that a sine wave has numerous periods, which are not explicitly shown, but are merely repetitions of the periods shown. Samples of generated sine wave 300 during period $P_2$ need not be separately stored in sine PROM 200A. As can be seen in FIG. 3, each sample during period $P_2$ (or any subsequent period) has the same value as some point on generated sine wave 300 during period $P_1$. For example, sample $S_6$ has the same value as the point during period $P_1$ denoted $S_6'$. Therefore, to produce a value for sample $S_6'$, the address corresponding to point $S_6'$, here address 409, must be applied to sine PROM 200A on line 202. Thus, to generate address for samples after the first period, those samples must be "mapped back" to points in the first period of the sine wave.

In operation, address on line 202 will be applied to since PROM 200A at a fixed rate, say every T seconds. A little thought reveals that if all the values stored in sine memory 200A are read out sequentially, the signal at the output of sine PROM 200A will have a period of T*8,192 or a frequency of $\frac{1}{8,192T}$.

To generate a higher frequency signal, values in sine PROM 200A are skipped. For example, in FIG. 3, generated sine wave 300 has a period 5.7*T and a frequency of 1/(5.7T). The values read from sine PROM 200A for samples $S_0...S_5$ are stored at addresses 0, 1432, 2866, 4299, 5733 and 7166. Thus, it can be seen that approximately 1433 values stored in sine PROM 200A are skipped between each of the samples $S_0...S_5$.

The number of skipped addresses, designated "$W_1$", can be computed from various parameters of the system. Assume the samples read out of sine PROM 200A are to represent a sine wave of frequency $f_1$. If samples are read out every T seconds, there will be some number of samples $X_1$, in one period of that sine wave. Using the relationship between the frequency and the period of a sine wave, the following equations can be written:

$f_1 = 1/(X_1 T)$  Eq. (1)

or $X_1 = 1/(f_1 T)$  Eq. (2)

There are M (here 8k) values of points in a sine wave stored in sine PROM 200A, but only $X_1$ are needed. It follows, therefore, that only every $M/X_1^{th}$ sample stored in sine PROM 200A need be read out. This relation can also be expressed as $W_1 = M/X_1$  Eq. (3)

or $W_1 = M f_1 T$  Eq. (4)

where $W_1$ is the number of addresses skipped in sine PROM 200A when reading out successive samples. For the $t_n^{th}$ sample, the address in sine PROM 200A equals address $= t_n * W_1$  Eq. (5)

A little thought will reveal that Eq. (5) is only good during the first period of the generated sine wave 300 since only one period of a sine wave is stored in sine PROM 200A. As was discussed above, the samples in the second and subsequent periods of the sine wave are mapped back to samples in the first period of the sine wave.

Mapping back is a two-step process. First, a multiple of the number of samples in a period of the generated sine wave is subtracted from $t_n$. Second, a multiple of a correction term is added.

In particular, the value of $t_n$ at the end of the first period is multiplied by the number of completed periods of the generated sine wave. That value is then subtracted from the value of $t_n$. The subtraction has the effect of resetting $t_n$ to zero at the beginning of each period of the generated sine wave. If the number of samples in one period of the generated sine wave is denoted $L_1$ (i.e. the value of $t_n$ at the end of the first period), and the number of periods of the generated sine wave is denoted $N_1$ then the first part of the mapping back is implemented by subtracting $N_1L_1$ from $t_n$.

The need for a correction factor, the second step of the mapping back process, can be understood by reference to FIG. 3. Sample $S_6$ is the first sample in the second period of the generated sine wave. If $t_n$ is effectively set back to zero at the beginning of the second period by the subtraction described above, the address computed for $S_6$ would be the same as the address computed for $S_0$. As can be seen, though, the address for $S_6$ should be the same as the address computed for $S_6'$. The address for $S_0$ is less than the address for $S_6'$ by a quantity $a_1$. A little thought reveals that $a_1$ can be calculated according to the equation $$a_1 = (X_1+1)W_{1-M;} \qquad \text{Eq. (6)}$$

where $(X_1+1)$ is the sample number of the first sample after the first period and $W_1(X_1+1)$ is the address that would be assigned to sample $(X_1+1)$ according to Eq. (5); and M is the number of addresses in the first period.

A little thought will reveal that each time a mapping back occurs, i.e. each time a new period of the generated sine wave starts, $a_1$ must be added to correct the generated address. Modifying Eq. (5) to reflect this mapping back, the address computation equation can be rewritten:

$$\text{address} = (t_n - N_1L_1)W_1 + N_1a_1 \qquad \text{Eq. (7)}$$

where $t_n$, $N_1$, $L_1$, $W_1$ and $a_1$ have the values as defined above.

Returning now to FIG. 2, it can be seen how the disclosed circuitry generates addresses according to Eq. (7). Initially, counter 210 has a value of zero such that the first location in period PROM 212, frequency PROM 216, phase PROM 218, and cycle count RAM 214 is accessed. The first location in period PROM 212 stores the value of $L_1$, the first location in frequency PROM 216 stores the value of $W_1$, and the first location in phase PROM 218 stores the value of $a_1$. The values in PROMs 212, 216 and 218 are computed in advance based on the frequency, $f_1$, which is desired.

Counter 206 stores the value of $t_n$. Initially, counter 206 is set to zero. Clock 204 produces one pulse every T seconds. Thus, counter 206 is incremented every T seconds to reflect the current value of $t_n$.

The first location in cycle count RAM 214 stores the value of $N_1$. Initially, the value of $N_1$ is set to zero. Comparator 230 has a logic high output when a cycle of generated sine wave 300 has been completed. The first location of cycle count RAM 214 is incremented by one in any known manner when comparator 230 has a logic high output. Thus, the first location of cycle count RAM 214 is updated to reflect the number of cycles of the generated sine wave which have been completed.

As can be seen in FIG. 2, the inputs to comparator 230 are $L_1$ from period PROM 212 and the output of adder 224. A little thought reveals that the output of adder 224 represents $t_n - N_1L_1$. Comparator 230 produces a logic high output when $t_n - N_1L_1 = L_1$. Thus, comparator 230 produces a logic high output each time $t_n$ increases by $L_1$, which is desired. Comparator 230 can be constructed in any known manner. Here, comparator 230 compares two eight-bit quantities. It should be noted that the output of adder 224 has 16 bits. However, the value of that output never exceeds a value which can be represented in eight bits.

It can be seen, therefore, that the outputs of counter 206, period PROM 212, cycle count RAM 214, frequency PROM 216 and phase PROM 218 represents all of the quantities in Eq. (7). A little thought reveals that multipliers 220, 222 and 226, and adders 224 and 228 combine the quantities as indicated in Eq. (7). The result is applied on address line 202 to sine and cosine PROMs 200A and 200B to produce signals representing generated sine wave 300 (FIG. 3) as desired.

It will be recalled, though, that discrete chirp generator 108 generates samples of sine waves at a plurality of frequencies. To generate samples of one frequency, only the first location in PROMs 212, 216 and 218 are RAM 214 were used. To generate samples for a second frequency, values $L_2$, $W_2$, $a_2$ and $N_2$ describing a different frequency are stored in the second locations of PROMs 212, 216 and 218 and RAM 214. To access the values for the second frequency, counter 210 is incremented by one. To generate samples for more frequencies, different sets of values are stored in more locations of the memories and the value of counter 210 is incremented to access the sets in turn.

In operation, clock 208 runs at a much faster rate than clock 204. For each pulse from clock 204, clock 208 pulses enough times for counter 210 to generate addresses for each set of values stored in PROMs 212, 216, 218 and RAM 214.

The outputs of sine and cosine PROMs 200A and 200B therefore consist of time multiplexed samples of a plurality of signals at different frequencies. In other words, the first sample for each of the signals appears successively at the output; the second sample for each of the signals appears successively at the output; and so on. Time multiplexing is a well-known technique and circuitry (not shown) is known in the art to demultiplex the signals as required.

As described above, control circuitry (not shown) operates to apply the time multiplexed samples to amplifiers 106A...106N (FIG. 1). The time multiplexed samples could, of course, be applied to any form of utilization device requiring as an input a plurality of sinusoidal signals.

Having described one embodiment of the invention, numerous other embodiments might become apparent to one of skill in the art. For example, discrete chirp generator 108 was described as comprising a plurality of discrete components. The entire circuit, or any part of it, might also be fabricated on a single integrated circuit chip. As another example, FIG. 2 shows a discrete chirp generator constructed with a sine PROM and a cosine PROM. For certain applications one PROM could be omitted. It is felt, therefore, that the present invention should be limited only by the spirit of the appended claims.

What is claimed is:

1. Apparatus for producing digital words on an output line at a periodic rate, said digital words having values representing a plurality of periods of a sinusoid at a predetermined frequency, said apparatus comprising:
   (a) timing means for producing a digital word representing the passage of time;
   (b) memory means for storing digital words representing:
      (i) the length of one period of the sinusoid;
      (ii) the number of periods of the sinusoid that have been generated;
      (iii) the predetermined frequency; and
      (iv) an offset
   (c) arithmetic means, responsive to the timing means and the memory means, for computing an address; and
   (d) second memory means, responsive to the address computed by the arithmetic means, for storing digital words representing a sinusoid and for applying selected ones of the stored digital words to the output line at the periodic rate.

2. The apparatus of claim 1 wherein the arithmetic means comprises:
   (a) a first multiplier means for producing an output digital word representing the product of the digital word representing the length of one period and the digital word representing the number of periods;
   (b) a second multiplier means for producing an output digital word representing the product of the digital word representing the number of periods and the offset;
   (c) a first adder means for producing an output digital word representing the sum of the digital word representing the passage of time and the negative of the output digital word of the first multiplier means;
   (d) a third multiplier means for producing an output digital word representing the product of the digital word representing the predetermined frequency and the output digital word of the first adder means; and
   (e) a second adder means for producing the address representing the sum of the output digital word of the second multiplier means and the output digital word of the third multiplier means.

3. The apparatus of claim 1 wherein the arithmetic means implements the equation:

$$(t_n - NL)W + Na$$

where $t_n$ is the digital word representing the passage of time;
N is the digital word representing the number of periods;
L is the digital word representing the length of one period;
W is the digital word representing the predetermined frequency; and
a is the digital word representing the offset.

4. The apparatus of claim 1 for producing digital words on an output line, wherein
   the digital words on the output line have values representing a plurality of sinusoids at a plurality of predetermined frequencies.

5. The apparatus of claim 4 wherein the first memory means comprises means for storing
   (a) a first plurality of digital words, each one of the digital words representing the length of one period of one of the plurality of sinusoids;
   (b) a second plurality of digital words, each one of the digital words representing the number of periods of one of the plurality of sinusoids that have been generated;
   (c) a third plurality of digital words, each one of the digital words representing the predetermined frequency of one of the plurality of sinusoids; and
   (d) a fourth plurality of digital words, each such digital word representing an offset corresponding to one of the plurality of sinusoids.

6. The apparatus of claim 5 additionally comprising:
   control means for selecting at a second periodic rate, one of the first plurality of digital words, one of the second plurality of digital words, one of the third plurality of digital words, and one of the fourth plurality of digital words for application to the arithmetic means, wherein all of the selected digital words corresponds to the same one of the plurality of sinusoids.

7. The apparatus of claim 1 additionally comprising:
   (a) means for determining when digital words on the output line representing a full period of the sinusoid have been generated and for incrementing the value of the digital word in the first memory means representing the number of period of the sinusoid that have been generated.

8. Apparatus for generating signals representing a plurality of sinusoids, said apparatus comprising:
   (a) a first memory containing sequential samples of a sine wave; and
   (b) means for generating addresses for the first memory, said means comprising:
      (i) timing means;
      (ii) a second memory having one storage location for each one of the plurality of sinusoids, each such location containing a digital word indicating the number of clock pulses in one period of the corresponding sinusoid;
      (iii) a third memory having one storage location for each one of the plurality of sinusoids, each such location containing a digital word indicating the number of periods of the corresponding sinusoid that have been generated;
      (iv) a fourth memory having one storage location for each one of the plurality of sinusoids, each such location containing a digital word indicating the frequency;
      (v) a fifth memory having one storage location for each one of the plurality of sinusoids, each such location containing a digital word indicating a correction subtracted for each period of the corresponding sinusoid; and
      (vi) arithmetic means for combining words in each memory and the timing means to produce an address to the first memory.

* * * * *